July 9, 1935. D. N. CROSTHWAIT, JR 2,007,240
REMOTE CONTROL PROPORTIONAL MOVEMENT MOTOR
Filed Feb. 1, 1934    2 Sheets-Sheet 1
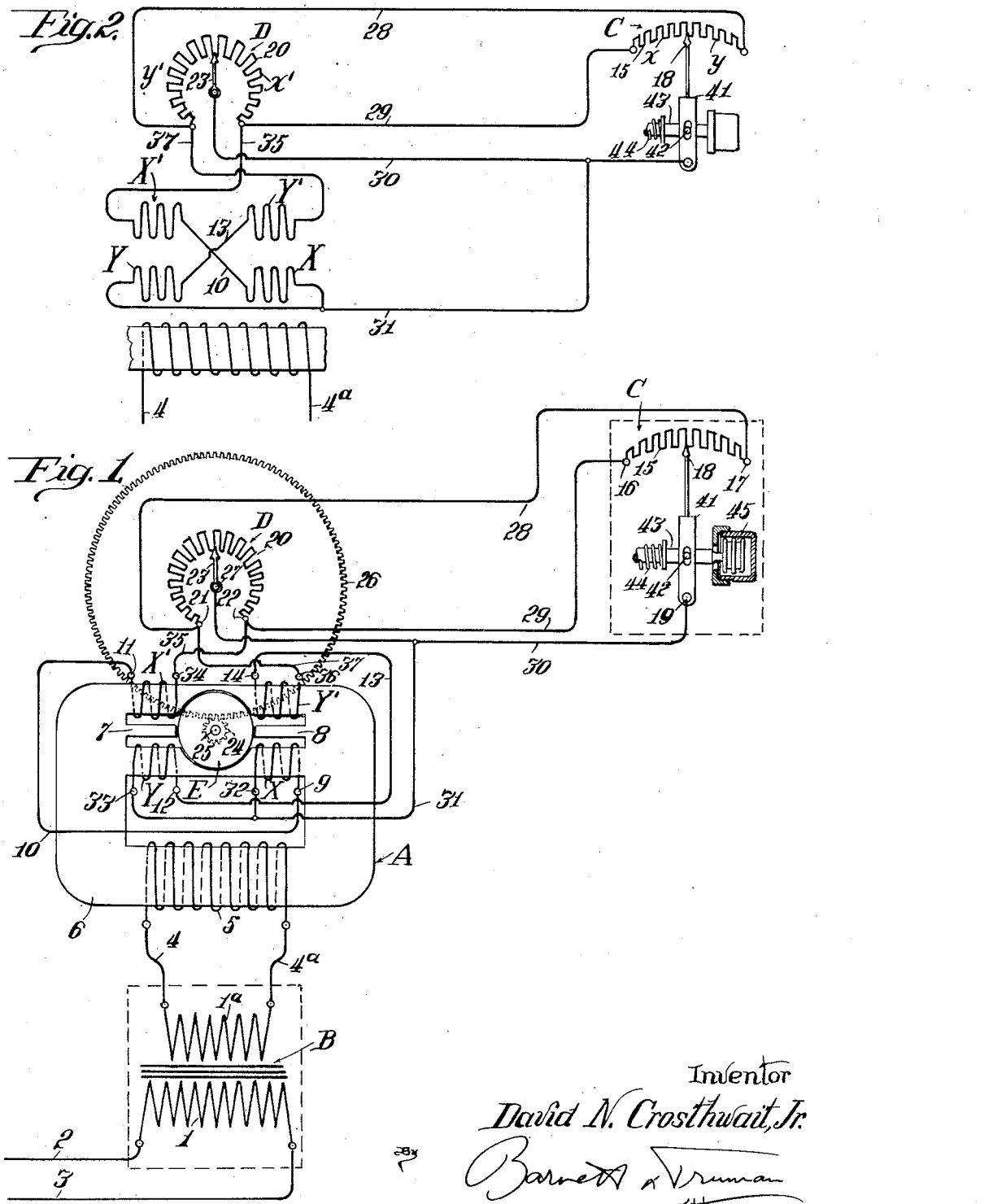
Inventor
David N. Crosthwait, Jr.
Attorneys July 9, 1935. D. N. CROSTHWAIT, JR 2,007,240
REMOTE CONTROL PROPORTIONAL MOVEMENT MOTOR
Filed Feb. 1, 1934 2 Sheets—Sheet 2
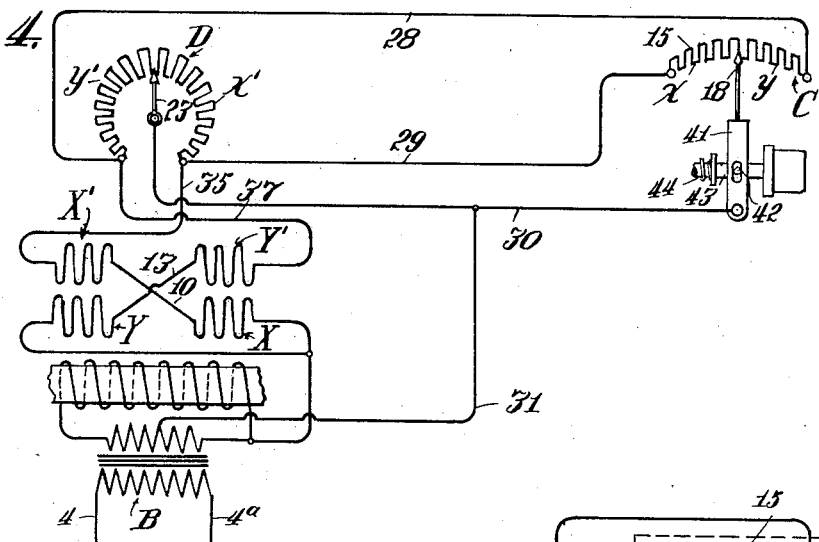
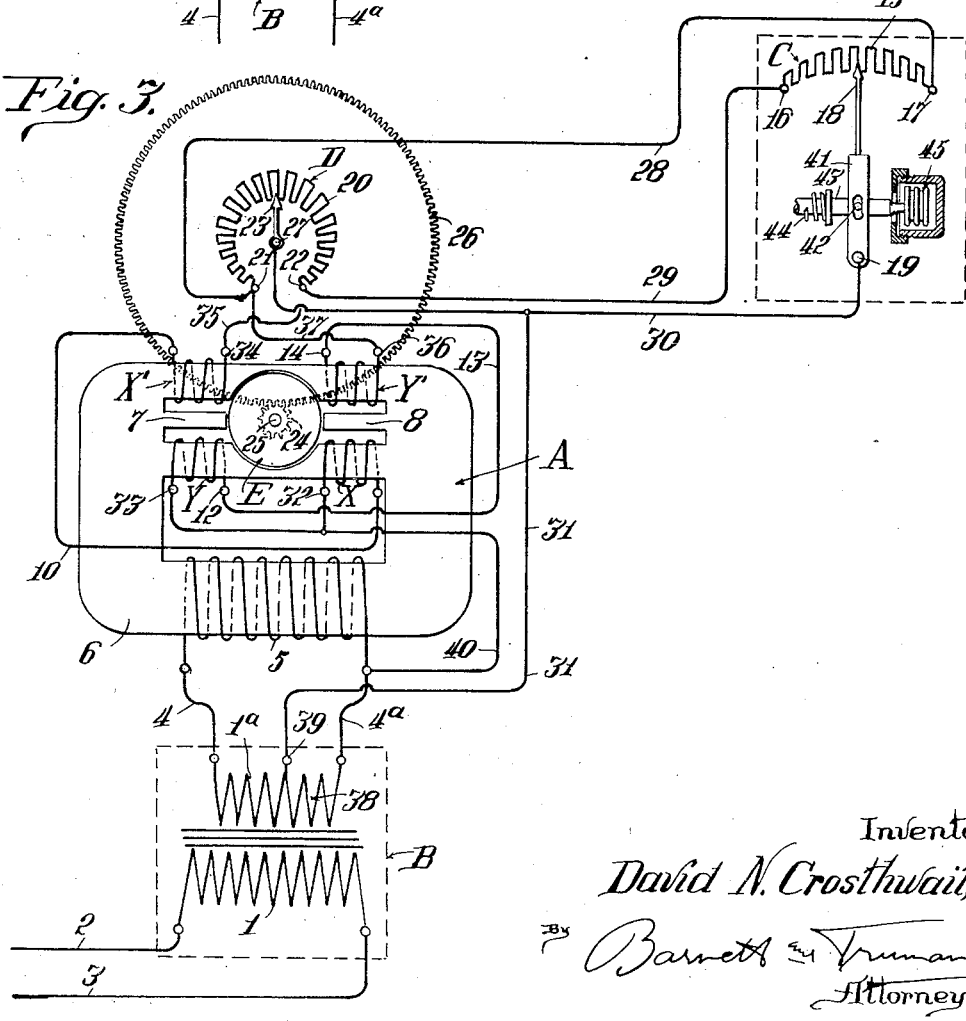
Inventor
David N. Crosthwait, Jr.
By Barnett & Truman
Attorneys Patented July 9, 1935

2,007,240

UNITED STATES PATENT OFFICE 2,007,240

REMOTE CONTROL PROPORTIONAL MOVEMENT MOTOR

David N. Crosthwait, Jr., Marshalltown, Iowa, assignor to C. A. Dunham Company, Marshalltown, Iowa, a corporation of Iowa Application February 1, 1934, Serial No. 709,301

12 Claims. (Cl. 172—239)

This invention relates to certain new and useful improvements in a remote control proportional movement motor, and more particularly to a proportional movement device comprising a single small reversible electric motor provided with means operable from a distance for causing rotation of the motor in either direction and to any desired degree so as to provide a definite adjustment of some device operated by the motor.

More specifically the invention comprises a small single phase alternating current motor having a rotor of a squirrel cage type, and provided with a plurality of shading coils, the coils being opposed so that one set of coils tends to cause the rotor to turn in one direction, and the other set tends to cause the rotor to turn in the opposite direction. Normally the currents flowing through the two sets of shading coils will be equal so that the fluxes produced by these coils will balance one another and the motor will remain at rest. Two sets of resistances are placed in circuit with the several shading coils, these resistances normally being balanced so that the currents flowing through the coils will be equal. One of these resistance devices, which may be positioned at any desired location is adjustable so that the effective resistances in circuit with the two opposed sets of shading coils may be unbalanced, thus causing rotation of the rotor in either desired direction. Another resistance or set of resistances positioned adjacent the motor is automatically moved or adjusted by the motor so as to restore the balance between the two shading coil energizing circuits and thus stop the rotor after it has moved a distance proportional to the setting established by the first-mentioned resistance devices.

The principal object of this invention is to provide an improved remote control proportional movement mechanism of the type briefly referred to hereinabove and disclosed more in detail in the specifications which follow.

Another object is to provide an improved shading coil mechanism for variably controlling a reversible alternating current motor.

Another object is to provide improved means for boosting or reinforcing the currents induced in the shading coils of a controlled alternating current motor.

Other objects and advantages of this invention will be more apparent from the following detailed description of certain approved forms of mechanism operating according to the principles of this invention.

In the accompanying drawings:

Fig. 1 is an elevation, largely diagrammatic, showing the proportional movement motor and the control mechanism therefor.

Fig. 2 is a wiring diagram showing more simply the electrical connections for the mechanism illustrated in Fig. 1.

Fig. 3 is an elevation similar to Fig. 1 showing a modification.

Fig. 4 is a wiring diagram for the mechanism shown in Fig. 3.

Referring first to Figs. 1 and 2, the mechanism comprises the motor A preferably of the single phase induction type, the transformer B which furnishes the power for energizing the motor, an adjustable resistance device C by which the motor is controlled from a distance, and the balancing resistance D which is automatically adjusted by the rotor E of motor A.

The transformer B comprises a primary coil 1 energized from the circuit wires 2 and 3, and a secondary coil 1ª which furnishes current at a properly reduced voltage through wires 4 and 4ª to the field coil 5 of motor A.

The field frame or stator 6 of motor A comprises the opposed poles 7 and 8 between which rotates the rotor or armature E, preferably of the squirrel cage type. The motor poles are provided with two sets of shading coils X, X' and Y, Y'. The shading coils X and X' are connected in series, one terminal 9 of coil X being connected by wire 10 with a terminal 11 of coil X'. These shading coils are so wound and positioned as to induce rotation of rotor E in one direction, for example in a clockwise direction, as shown in Fig. 1. Similarly, the shading coils Y and Y' are connected in series, the terminal 12 of coil Y being connected through wire 13 with the terminal 14 of coil Y'. These coils Y and Y' are so wound and positioned as to induce rotation of rotor E in a counter-clockwise direction. It will be apparent that the forces exerted by the two pairs of shading coils are opposed to one another, and when the current induced in and flowing in the coils X and X' is of the same magnitude as the current induced and flowing in the coils Y and Y', the forces exerted by these several coils will offset one another and the motor will remain at rest.

The resistance mechanism C may be similar to that used in the ordinary potentiometer, comprising a suitable arcuate resistance 15 connected between the terminals 16 and 17 and adapted to be divided into two effective portions by means of the movable contact member 18 pivotally mounted at a third terminal 19.

The balancing resistance device D comprises an arcuate resistance member 20 connected between the terminals 21 and 22 and adapted to be divided into two effective portions by the rotary contact member 23. The contact 23 is positioned with relation to resistance 20 by the rotation of the rotor E of the motor. As here shown, a small pinion 24 on the motor shaft 25 meshes with a large gear 26 keyed on shaft 27 which carries the movable contact 23. Any equivalent form of suitable reduction gearing can be used, and the mechanism driven or adjusted by the motor (for example a valve which is moved toward open or closed position) can be actuated by the shaft 27 or some part connected therewith.

Terminal 17 of resistance C is connected with terminal 21 of resistance D by the wire 28. Similarly, terminal 16 of resistance C is connected with terminal 22 of resistance D by the wire 29. The movable contact members 18 and 23 of the two resistance devices are connected by wire 30 from which wire 31 leads to the terminals 32 and 33 of the shading coils X and Y, respectively. The remaining terminal 34 of shading coil X' is connected through wire 35 with terminal 22 of resistance D. Terminal 36 of shading coil Y' is connected through wire 37 with the terminal 21 of balancing resistance D.

Referring now to Fig. 2 in which the circuit may be more clearly followed, it will be noted that the resistance C is divided by movable contact 18 into two effective resistances $x$ and $y$, and similarly the balancing resistance D is divided into two resistances $x'$ and $y'$. The resistances $x$ and $x'$ are coupled in parallel with one another, but the couple is connected in a closed series circuit with the shading coils X and X'. In other words, a portion of the current induced in coils X and X' flows through wire 35, resistance $x'$, contact 23, and wires 30 and 31 back to the coil X. Another portion of this current flows from coil X' through wires 35 and 29, resistance $x$, contact 18 and wires 30 and 31 back to coil X. In an exactly similar manner the resistances $y$ and $y'$ are connected in parallel with one another, but in series with the shading coils Y and Y'.

It will now be apparent that as long as the resistances C and D are equally divided, that is the resistance portions $x$ and $y$ are equal, and the resistance portions $x'$ and $y'$ are equal, the amount of resistance in series with each pair of shading coils will be equal so that the same currents will flow in each set of coils, and the torque tending to cause clockwise rotation of the rotor E will be the same as the torque tending to cause counter-clockwise rotation so that the motor will remain at rest.

Let us assume now that the movable contact 18 of the actuating resistance C is moved (either manually or automatically) toward the right so as to increase the resistance $x$ and decrease the resistance $y$. It will now be apparent that the total effective resistance in circuit with the shading coils X, X' has been increased, and the resistance in circuit with shading coils Y, Y' has been decreased, with the result that a greater current will flow in the coils Y, Y', and the torque exerted by these coils will overpower the decreased torque exerted by the coils X, X' so that the motor will rotate in a counter-clockwise direction. This will cause pinion 24 to rotate in a counter-clockwise direction and gear 26 will rotate at a greatly reduced rate in the clockwise direction so as to adjust movable contact 23 of balancing resistance D toward the right, thus increasing the resistance $y'$ and decreasing the resistance $x'$. When contact 23 has been moved to such a position that the effective resistance of the couple $x$, $x'$ just balances the resistance couple $y$, $y'$, then the currents flowing in the two sets of shading coils will be equalized and the motor will stop. In an exactly similarly manner, if the movable contact 18 of actuating resistance C is adjusted toward the left, the current in shading coils X, X' will be strengthened and the current in coils Y, Y' decreased, so that a clockwise rotation of the motor will result. The distance the motor rotates in either direction will be proportional to the distance that the movable contact 18 has been moved, since the movable contact 23 must be moved a proportionate distance before their resistances are again balanced so that the motor will stop.

Preferably the resistances of the control and balancing mechanisms C and D are equal and are so distributed that the sensitivity of the control of the motor is uniform throughout the total range of operation, although if this uniform action is not desired or required the resistances need not be so distributed.

The wiring connections for the resistances might be so arranged that the portions $x$ and $x'$ and $y$ and $y'$, of the resistances C and D would be connected in series with one another instead of in parallel. It is only essential that the effective resistance in circuit with one set of shading coils be varied with respect to the effective resistance in circuit with the other set of shading coils so that rotation of the motor in one direction will be induced, and that this rotation of the motor shall again restore the balance between the resistances so as to stop the motor after an arcuate travel proportional to the amount that the control resistances have been initially thrown out of balance.

In the modification shown in Figs. 3 and 4, the construction and operation is the same as already described except for the fact that a selected portion 38 of the secondary coil 1a of transformer B is connected in series with the series circuits of each of the sets of shading coils and their bridging resistances. The connections are such that the current furnished from the portion 38 of the transformer secondary will boost or reinforce the currents induced in the shading coils so as to strengthen the torque exerted by these coils and thus increase the effective strength of the motor and the sensitivity of the proportional control mechanism. It will be noted that the wire 31 (which in Figs. 1 and 2 was connected with one terminal of each of the shading coils X and Y) is, in Figs. 3 and 4, connected with the tap terminal 39 of transformer secondary 1a, the other terminal of this tapped portion of the secondary being connected through wire 40 with the shading coils X and Y. The other portions of the circuits remain the same as already described in connection with Figs. 1 and 2.

Devices of the type above described (either modification) may be used for a variety of purposes, wherever it is desired to control some device from a remote location so as to move or adjust the device a desired amount in either direction. For example, in certain types of steam heating systems, it is desirable to adjust a control valve or reducing valve toward open or closed positions, a distance proportionate to temperature changes at some remote location. As shown in the drawings, the lever 41 which carries the movable contact 18 of control resistance C is connected by a pin and slot connection 42 with an operating stem 43 which is urged in one direction by an adjustable spring 44 and which is urged in the opposite direction by a thermostatic element 45, here shown in the form of a closed expansible chamber containing a heat-responsive fluid. The movable contact 18 will be adjusted in one direction or the other in accordance with temperature changes in the vicinity of this thermostatic mechanism, and as a result the proportioning motor A will move the steam control valve toward open or closed position, by means of suitable mechanical connections with the rotor E or shaft 27. For example, if the temperature rises in the vicinity of the thermostatic device, the chamber 45 will expand, thus swinging movable contact 18 toward the left, strengthening the current in shading coils X, X' and causing a clockwise rotation of rotor E. The connections will be such that this rotation will partially close the steam control valve, the amount that the valve is closed being proportionate to the distance contact 18 has been moved, which will in turn be proportionate to the temperature change which has affected the thermostatic device 45. When the temperature again falls, the thermostatic device 45 will contract, the movable contact 18 will be drawn toward the right, causing a counter-clockwise rotation of the motor and again opening the valve.

If desired, the movable contact 18 may be positioned manually, and the valve or other mechanism will be adjusted a distance proportionate to the adjusted setting of contact 18.

While the motor A has been disclosed (by way of example) in a simple form provided with two pairs of opposed poles, a greater number, such as four pairs of poles could be used if desired. Furthermore the transformer B is only disclosed since it is ordinarily desirable to operate this device with a current of reduced potential. However, the apparatus could be operated with currents of any reasonable potential providing the electrical devices are properly wound to carry such currents.

I claim:

1. In combination with an alternating current motor comprising a stator and a rotor and two sets of opposed shading coils, one set tending to induce rotation of the rotor in one direction and the other set tending to induce rotation of the rotor in the other direction, resistances in closed circuit with each set of shading coils, and means for varying the relative values of these resistances to unbalance the currents flowing in the respective shading coils to cause rotation of the rotor in either desired direction.

2. In combination with an alternating current motor comprising a stator and a rotor and two sets of opposed shading coils, one set tending to induce rotation of the rotor in one direction and the other set tending to induce rotation of the rotor in the other direction, means for unbalancing the currents flowing in the respective shading coils to cause rotation of the rotor in either desired direction, and means automatically adjusted by the resulting rotation of the rotor for restoring the balance between the currents in the respective shading coils.

3. In combination with an alternating current motor comprising a stator and a rotor and two sets of opposed shading coils, one set tending to induce rotation of the rotor in one direction and the other set tending to induce rotation of the rotor in the other direction, means for unbalancing to a selected degree the currents flowing in the respective shading coils, and means automatically moved by a rotation of the rotor corresponding in amplitude to the degree of unbalance between the currents for restoring the balance and stopping the motor.

4. In combination with an alternating current motor comprising a stator, a rotor and two opposed sets of shading coils, one set tending to induce rotation of the rotor in one direction and the other set tending to induce rotation of the rotor in the other direction, a pair of variable resistances in circuit respectively with the two sets of shading coils, a pair of balancing resistances also in circuit with the shading coils, and means actuated by the rotor for adjusting the balancing resistances.

5. In combination with an alternating current motor comprising a stator, a rotor and two opposed sets of shading coils, one set tending to induce rotation of the rotor in one direction and the other set tending to induce rotation of the rotor in the other direction, a pair of variable resistances in circuit respectively with the two sets of shading coils, means responsive to temperature changes for automatically increasing one of the variable resistances and simultaneously decreasing the other, a pair of balancing resistances also in circuit with the shading coils, and means actuated by the rotor for adjusting the balancing resistances.

6. In combination with an alternating current motor comprising a stator, a rotor and two opposed sets of shading coils, one set tending to induce rotation of the rotor in one direction and the other set tending to induce rotation of the rotor in the other direction, a pair of variable resistances in circuit respectively with the two sets of shading coils, means for varying the relative values of these resistances, a pair of balancing resistances also in circuit with the shading coils, and means actuated by rotation of the rotor as caused by the unbalancing of the first mentioned resistances, to adjust the balancing resistances so as to equalize the total effective resistance in circuit with each set of shading coils.

7. In combination with an alternating current motor comprising a stator, a rotor and two opposed sets of shading coils, one set tending to induce rotation of the rotor in one direction and the other set tending to induce rotation of the rotor in the other direction, a control resistance and a similar balancing resistance, each comprising a movable contact member engaging an intermediate portion of the resistance to divide the resistance into two portions of relatively variable values, a circuit including one set of shading coils, the movable contacts and one portion of each resistance, a second circuit including the other set of shading coils, the movable contacts and the remaining portions of the resistances, means for moving the contact of the control resistance to unbalance the circuits and cause a rotation of the rotor in one direction, and means actuated by the rotor for moving the contact of the balancing resistance to restore the balance between the circuits.

8. In combination with an alternating current motor comprising a stator, a rotor and two opposed sets of shading coils, one set tending to induce rotation of the rotor in one direction and the other set tending to induce rotation of the rotor in the other direction, a control resistance and a similar balancing resistance, each comprising a movable contact member engaging an intermediate portion of the resistance to divide the resistance into two portions of relatively variable values, a circuit including one set of shading coils, the movable contacts and one portion of each resistance, a second circuit including the other set of shading coils, the movable contacts and the remaining portions of the resistances, thermostatically operated means for moving the contact of the control resistance to unbalance the circuits and cause a rotation of the rotor in one direction, and means actuated by the rotor for moving the contact of the balancing resistance to restore the balance between the circuits.

9. In combination with an alternating current motor comprising a stator, a rotor and two opposed sets of shading coils, one set tending to induce rotation of the rotor in one direction and the other set tending to induce rotation of the rotor in the other direction, a control resistance and a similar balancing resistance, each comprising a movable contact member engaging an intermediate portion of the resistance to divide the resistance into two portions of relatively variable values, a circuit including one set of shading coils, the movable contacts and one portion of each resistance, a second circuit including the other set of shading coils, the movable contacts and the remaining portions of the resistances, means for moving the contact of the control resistance to unbalance the circuits and cause a rotation of the rotor in one direction, means actuated by the rotor for moving the contact of the balancing resistance to restore the balance between the circuits, a source of current for energizing the stator of the motor, and connections for delivering current from this source into the above mentioned shading coil circuits.

10. In combination with an alternating current motor comprising a stator, a rotor and two opposed sets of shading coils, one set tending to induce rotation of the rotor in one direction and the other set tending to induce rotation of the rotor in the other direction, a control resistance and a similar balancing resistance, each comprising a movable contact member engaging an intermediate portion of the resistance to divide the resistance into two portions of relatively variable values, a circuit including one set of shading coils, the movable contacts and one portion of each resistance, a second circuit including the other set of shading coils, the movable contacts and the remaining portions of the resistances, means for moving the contact of the control resistance to unbalance the circuits and cause a rotation of the rotor in one direction, means actuated by the rotor for moving the contact of the balancing resistance to restore the balance between the circuits, and a transformer having its secondary coil in circuit with the motor stator to energize the same, a portion of the secondary coil being included in the above mentioned shading coil circuits.

11. In combination with an alternating current motor comprising a stator, a rotor and two opposed sets of shading coils, one set tending to induce rotation of the rotor in one direction and the other set tending to induce rotation of the rotor in the other direction, a control resistance and a similar balancing resistance each comprising a movable contact member engaging an intermediate portion of the resistance to divide the resistance into two portions of relatively variable values, wiring connections for joining one portion of the control resistance in parallel with one portion of the balancing resistance, and the two in a series circuit with one set of shading coils, similar wiring connections for connecting the remaining portions of the resistances in parallel with one another and in series with the other set of shading coils, means for moving the contact of the control resistance to unbalance these circuits, and means actuated by the rotor for moving the contact of the balancing resistance to restore the balance between the circuits.

12. In combination with an alternating current motor comprising a stator, a rotor and two opposed sets of shading coils, one set tending to induce rotation of the rotor in one direction and the other set tending to induce rotation of the rotor in the other direction, a control resistance and a similar balancing resistance each comprising a movable contact member engaging an intermediate portion of the resistance to divide the resistance into two portions of relatively variable values, wiring connections for joining one portion of the control resistance in parallel with one portion of the balancing resistance, and the two in a series circuit with one set of shading coils, similar wiring connections for connecting the remaining portions of the resistances in parallel with one another and in series with the other set of shading coils, means for moving the contact of the control resistance to unbalance these circuits, means actuated by the rotor for moving the contact of the balancing resistance to restore the balance between the circuits, a source of current for energizing the stator of the motor, and connections for delivering current from this source into the above mentioned shading coil circuits.

DAVID N. CROSTHWAIT, Jr.